(12) United States Patent
Haustein et al.

(10) Patent No.: US 10,191,814 B2
(45) Date of Patent: Jan. 29, 2019

(54) RESTORING DATA IN A HIERARCHICAL STORAGE MANAGEMENT SYSTEM

(71) Applicant: International Business Machines Corporation, Armonk, NY (US)

(72) Inventors: Nils Haustein, Soergenloch (DE); Christian Mueller, Dichtelbach (DE); Dominic Mueller-Wicke, Weilburg (DE)

(73) Assignee: International Business Machines Corporation, Armonk, NY (US)

( * ) Notice: Subject to any disclaimer, the term of this patent is extended or adjusted under 35 U.S.C. 154(b) by 627 days.

(21) Appl. No.: 14/734,074

(22) Filed: Jun. 9, 2015

(65) Prior Publication Data

US 2015/0363271 A1    Dec. 17, 2015

(30) Foreign Application Priority Data

Jun. 16, 2014    (GB) .................................. 1410671.0

(51) Int. Cl.
G06F 17/30    (2006.01)
G06F 11/14    (2006.01)

(52) U.S. Cl.
CPC ...... *G06F 11/1451* (2013.01); *G06F 11/1464* (2013.01); *G06F 11/1469* (2013.01); *G06F 17/3023* (2013.01)

(58) Field of Classification Search
CPC ............. G06F 11/1451; G06F 11/1464; G06F 11/1469
See application file for complete search history.

(56) References Cited

U.S. PATENT DOCUMENTS

| 5,822,780 A | 10/1998 | Schutzman |
| 6,000,020 A | 12/1999 | Chin et al. |
| 6,023,709 A | 2/2000 | Anglin et al. |

(Continued)

FOREIGN PATENT DOCUMENTS

WO    2005081942 A2    9/2005

OTHER PUBLICATIONS

IBM et al., "Method for improving hierarchical storage management using extended file properties", An IP.com Prior Art Database Technical Disclosure, Original Publication Date: Apr. 10, 2006, IP.com No. 000135311, IP.com Electronic Publication: Apr. 10, 2006, pp. 1-2.

(Continued)

*Primary Examiner* — Loc Tran
(74) *Attorney, Agent, or Firm* — Bryan D. Wells

(57) ABSTRACT

The present disclosure provides a hierarchical storage management system for storing data. A first controller receives a request to migrate a data item to a first storage tier. The data item is associated with at least an initial object ID. The first controller, in response to the request, generates a new object ID and identifies a first record in a data structure, wherein the initial object ID is identical to an object ID of the first record and to a parent object ID of the first record. The first controller replaces the object ID of the first record with the new object ID, creates in the data structure a new record that is associated with the data item, sets an object ID of the new record and a parent object ID of the new record to the initial object ID, and stores the data item to the first storage tier.

20 Claims, 3 Drawing Sheets

(56) References Cited

U.S. PATENT DOCUMENTS

| | | | |
|---|---|---|---|
| 6,182,121 B1* | 1/2001 | Wlaschin | G06F 17/30168 |
| | | | 707/999.001 |
| 7,177,883 B2 | 2/2007 | Yagawa | |
| 2005/0246386 A1 | 11/2005 | Sullivan et al. | |
| 2008/0154988 A1 | 6/2008 | Shiozawa et al. | |
| 2009/0063556 A1* | 3/2009 | Nemoto | G06F 17/30079 |
| 2013/0268493 A1 | 10/2013 | Berman et al. | |
| 2013/0326144 A1 | 12/2013 | Jaquette | |
| 2013/0346371 A1 | 12/2013 | Beck | |

OTHER PUBLICATIONS

IBM et al., "System and method for data protection in a hierarchical storage management system", An IP.com Prior Art Database Technical Disclosure, Original Publication Date: Dec. 8, 2008, IP.com No. 000177306, IP.com Electronic Publication: Dec. 8, 2008, pp. 1-3.

Zhang et al., "Tiered Adaptive Large-Scale Storage System with High Performance", Abstract Aug. 2013, DOI 10.4028/www.scientific.net/AMM.380-384.2371, pp. 1-3.

"A method for restoring data in a HSM system", United Kingdom application No. 1410671.0, filed Jun. 16, 2014, pp. 1-49.

Brubeck et al., "Hierarchical storage management in a distributed VOD system", pp. 37-47 Date of Publication: Fall 1996, IEEE, vol. 3, Issue 3, https://ieeexplore.ieee.org/document/556538/ (abstract only).

* cited by examiner

|   | 211 | 212 | 213 | 214 | 215 | 216 |
|---|---|---|---|---|---|---|
|   | Data identifier | Object ID | Parent Object ID | Storage date | Storage location | metadata |
| 201 | /home/myfile.txt | 12345 | 12345 | 23-08-2013 12:00:00 | /home/users/user1/myfile.txt.1 | /12345/metadata.Object.1 |

200a

|   | Data identifier | Object ID | Parent Object ID | Storage date | Storage location | metadata |
|---|---|---|---|---|---|---|
| 202 | /home/myfile.txt | 13690 | 12345 | 23-08-2013 12:00:00 | /home/users/user1/myfile.txt.1 | /12345/metadata.Object.1 |
| 203 | /home/myfile.txt | 12345 | 12345 | 24-08-2013 12:00:00 | /home/users/user1/myfile.txt.2 | /12345/metadata.Object.2 |

200b

|   | Data identifier | Object ID | Parent Object ID | Storage date | Storage location | metadata |
|---|---|---|---|---|---|---|
| 204 | /home/myfile.txt | 13690 | 12345 | 23-08-2013 12:00:00 | /home/users/user1/myfile.txt.1 | /12345/metadata.Object.1 |
| 205 | /home/myfile.txt | 14567 | 12345 | 24-08-2013 12:00:00 | /home/users/user1/myfile.txt.2 | /12345/metadata.Object.2 |
| 206 | /home/myfilenew.txt | 12345 | 12345 | 25-08-2013 12:00:00 | /home/users/user1/myfilenew.txt.3 | /12345/metadata.Object.3 |

200c

|   | Data identifier | Object ID | Parent Object ID | Storage date | Storage location | metadata |
|---|---|---|---|---|---|---|
| 207 | /home/myfile.txt | 13690 | 12345 | 23-08-2013 12:00:00 | /home/users/user1/myfile.txt.1 | /12345/metadata.Object.1 |
| 208 | /home/myfile.txt | 14567 | 12345 | 24-08-2013 12:00:00 | /home/users/user1/myfile.txt.2 | /12345/metadata.Object.2 |
| 209 | /home/myfilenew.txt | 15564 | 12345 | 25-08-2013 12:00:00 | /home/users/user1/myfilenew.txt.3 | /12345/metadata.Object.3 |
| 210 | /home/myfilenew.txt | 12345 | 12345 | 26-08-2013 12:00:00 | /home/users/user1/myfilenew.txt.3 | /12345/metadata.Object.4 |

RESTORING DATA IN A HIERARCHICAL STORAGE MANAGEMENT SYSTEM

FIELD OF THE INVENTIONS

The invention relates to computing systems, and more particularly to a method for storing data in a hierarchical storage management system.

BACKGROUND OF THE INVENTION

Hierarchical Storage Management (HSM) is a technique that allows storing data on the most appropriate storage medium over the lifecycle of the data. HSM is implemented on a storage system that includes at least two tiers of storage, for example one tier provided by hard disk drives and one tier provided by tapes. Data is first placed on the first tier of storage (such as disk) and later migrated to the second tier (such as tape). Thereby the access to the data migrated to the second tier is transparent via the first tier. HSM may be implemented on file systems whereby the data subject for migration is a file or directory. HSM may also be implemented on block storage systems whereby the data subject for migration is a block. Thus data can be a file, an object or a block.

SUMMARY

According to one embodiment of the present disclosure, a method for storing data in a hierarchical storage management (HSM) system is provided. The method includes receiving, by a first controller, a request to migrate a data item to a first storage tier managed by the first controller, wherein the data item is associated with at least an initial object ID and a HSM status parameter value indicating that the data item is in a resident state, and, in response: generating, by the first controller, a new object ID; identifying, by the first controller, a first record in a data structure that includes a plurality of records based, at least in part, on the initial object ID being identical to an object ID of the first record and to a parent object ID of the first record; replacing, by the first controller, the object ID of the first record with the new object ID; creating, by the first controller, a new record in the data structure, wherein the new record is associated with the data item; setting, by the first controller, an object ID field of the new record and a parent object ID field of the new record to the initial object ID; and storing, by the first controller, the data item to the first storage tier.

According to another embodiment of the present disclosure, a computer program product for storing data in a hierarchical storage management (HSM) system is provided. The computer program product comprises a computer readable storage medium and program instructions stored on the computer readable storage medium. The program instructions include program instructions to receive a request to migrate a data item to a first storage tier managed by a first controller, wherein the data item is associated with at least an initial object ID and a HSM status parameter value indicating that the data item is in a resident state, and, in response: generate a new object ID; identify a first record in a data structure that includes a plurality of records based, at least in part, on the initial object ID being identical to an object ID of the first record and to a parent object ID of the first record; replace the object ID of the first record with the new object ID; create a new record in the data structure, wherein the new record is associated with the data item; set an object ID field of the new record and a parent object ID field of the new record to the initial object ID; and store the data item to the first storage tier.

According to another embodiment of the present disclosure, a computer system for storing data in a hierarchical storage management (HSM) system is provided. The computer system includes one or more computer processors, one or more computer readable storage media, and program instructions stored on the computer readable storage media for execution by at least one of the one or more processors. The program instructions include program instructions to receive a request to migrate a data item to a first storage tier managed by a first controller, wherein the data item is associated with at least an initial object ID and a HSM status parameter value indicating that the data item is in a resident state, and, in response: generate a new object ID; identify a first record in a data structure that includes a plurality of records based, at least in part, on the initial object ID being identical to an object ID of the first record and to a parent object ID of the first record; replace the object ID of the first record with the new object ID; create a new record in the data structure, wherein the new record is associated with the data item; set an object ID field of the new record and a parent object ID field of the new record to the initial object ID; and store the data item to the first storage tier.

BRIEF DESCRIPTION OF THE DRAWINGS

FIG. 2 shows tables for storing data items in accordance with the present invention.

DETAILED DESCRIPTION

Figure 1:
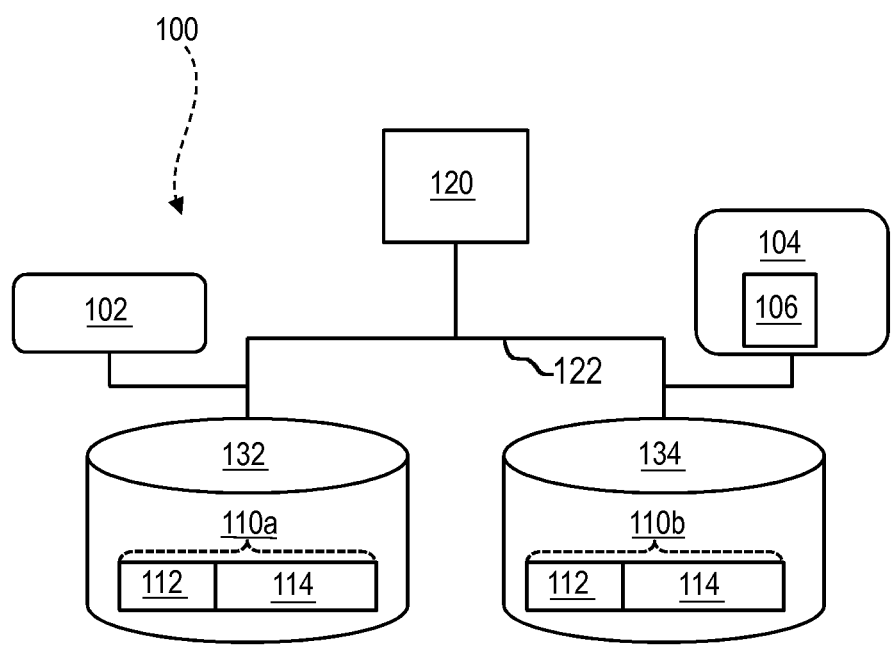
FIG. 1 illustrates an exemplary computer system for data versioning in a HSM system.

In the following, like numbered elements in the figures either designate similar elements or designate elements that perform an equivalent function. Elements which have been discussed previously will not necessarily be discussed in later figures if the function is equivalent.

The present disclosure provides a system and methods for storing multiple versions of data that has been migrated or pre-migrated in an HSM system. Furthermore methods are taught that allow restoring older versions of data from a HSM system. Furthermore methods are taught that allow performing full backups without transferring data content that has already been transferred. Furthermore methods are taught that allow restoring full backups from the HSM system.

The above features may have the advantage of enabling the restore or recovery of previous versions of data (when needed) stored in the HSM system. This is in contrast to the conventional HSM system that is configured to handle and store the most up-to date version of the data only.

Another advantage may reside in the fact that the present method may be seamlessly integrated in the existing HSM systems as it makes use of the existing infrastructure of HSM system and introduces changes with reduced burden into the HSM system.

Another advantage may be that the backup and migration is handled by the same components within the HSM system. Thus it contributes to infrastructure simplification since no separate backup client or agent is required. It also decreases the operational efforts for managing backup and HSM data because backup and HSM is done in concert. Embodiments of the present disclosure also contribute to storage capacity optimization for backup and HSM data because they eliminate the need to store multiple copies of the same file.

According to one embodiment, the method further comprises, in response to a determination that the HSM status parameter value of the data item indicates the resident state and that the data item is associated with the initial object ID, sending by the HSM client a data storage request to the HSM server for storing the data item, the data storage request including at least the data item and the initial object ID. The data storage request may further comprise a data identifier of the data item. The data identifier may be a user-defined identifier. The data identifier may comprise, for example, a file name of the data item. The method further including: generating by the HSM server a new object ID for the data item, the generated object ID corresponding to subsequent version of the data item different from the first version; selecting by the HSM server a record from one or more records in the data structure where the parent object ID field is identical to the initial object ID, the selected record having the youngest creation date determined using the date field; updating by the HSM server the object ID field of the selected record with the generated object ID; creating by the HSM server a new record in the data structure where the parent object ID field and object ID field are set to the initial object ID; determining by the HSM server a storage location for the data item on the second storage tier and storing the data item in the storage location and setting the date field of the created record to the storage date of the data item and/or the creation date of the record; and sending by the HSM server an acknowledgment message as a response to the received data storage request.

According to one embodiment, the method further includes: in case the move request is a migration request, updating, by the HSM client, the HSM status parameter value to the second value and creating a stub file in the HSM client referring to the stored data item; and, in case the move request is a pre-migration request, updating, by the HSM client, the HSM status parameter value to the first value.

Embodiments of the present disclosure provide the advantage of considering existing data that has been already stored in the system.

According to one embodiment, the method further includes receiving a request by the HSM client to restore one or more versions of the data item; sending a restore request by the HSM client to the HSM server along with the initial object ID of the data item; determining by the HSM server all records in the data structure where the parent object ID is identical to the initial object ID and storing that records in a restore list sorted by record creation date in an ascending order; sending the record list by the HSM server to the HSM client; receiving by the HSM server a selection of at least one record of the record list; determining by the HSM server the storage location indicated in the at least one record; and sending the data from the storage location and metadata of the data (if it is stored together with the data) to the HSM client by the HSM server.

For example, the HSM client may perform an automatic selection of the at least one record of the record list. In another example, the HSM client may prompt a user of the HSM system with the record list for receiving a selection of the at least one record. In yet another embodiment, the HSM client may perform the selection of the at least one record based on the input it received with the restore request.

According to one embodiment, the data structure further includes a version field. The method further includes, in response to a determination that the HSM status parameter value of the data item indicates the resident state, and that the data item is not associated with the initial object ID, initializing a version number in the version field of the created record. For example, the version number may be initialized using a string indicative of the version e.g. "v1". In another example, the version number may comprise a date and time stamp. In response to a determination that the HSM status parameter value of the data item indicates the resident state and that the data item is associated with the initial object ID, reading the version number of selected record; incrementing the version number of the selected record; and setting the version field of the created record to the incremented version number.

According to one embodiment, the method further includes receiving a request by the HSM client to restore a predefined version of the data item; sending a restore request by the HSM client to the HSM server along with the initial object ID of the data item and the predefined version; determining all records in the data structure where the parent object ID is identical to the initial object ID; selecting the record having the predefined version number; and determining by the HSM server the storage location of the selected record and sending the data from the storage location and metadata of the data (if it is stored together with the data) to the HSM client by the HSM server.

According to one embodiment, the method further includes, in response to a determination that the HSM status parameter value of the data item indicates the migrated state or pre-migrated state, rejecting the received request to move the data item.

According to one embodiment, the method further includes, in response to a determination that the number of records of the one or more records is greater than a predefined maximum number of versions, deleting records with the oldest storage date until the number of records is equal to the predefined maximum number of versions. Embodiments that delete records in this manner may be advantageous as it may control the storage of the multiple versions of data in the HSM system, by for example preventing that the stored data do not exceed a given storage capacity of the HSM system. The expression "a record with a storage date" refers to a record corresponding to a version of the data item stored in the second storage tier at the storage date.

According to one embodiment, the data item is further associated with metadata that is stored in the HSM client and in a metadata field of the data structure, wherein the method further includes: receiving, by the HSM client, a request to synchronize the data item from the first storage tier with the data item on the second storage tier, wherein the HSM status parameter has one of the first and second values; sending by the HSM client the initial object ID along with the metadata stored in the HSM client to the HSM server; identifying by the HSM server one or more records of the data structure having the parent object ID identical to the object initial object ID; selecting by the HSM server the record of the one or more records having the youngest creation date; comparing by the HSM server the metadata received from the versioning HSM client with the metadata of the selected record and if the metadata does not match updating the metadata field of the selected record in the data structure with the metadata received from the HSM client.

The metadata may include access control lists (ACL), attributes and extended attributes further describing the data item.

Embodiments that associate the data item with metadata may be advantageous as changes of metadata such as access control list or extended attributes do not cause the entire data content of the data item in the HSM client to be transferred i.e. just the metadata is transferred.

According to one embodiment, the method further includes: receiving a request by the HSM client to restore a data item of the multiple data items, said request indicating a full backup date and time stamp of the data item; sending a restore request by the HSM client to the HSM server along with the initial object ID of the requested data item and the full backup date; determining and selecting the record in the data structure where the parent object ID is identical to the initial object ID and the full backup date field is identical to the full backup date and time stamp; determining the storage location from the selected record in the data structure by the HSM server and sending the data from this storage location to the HSM client. This embodiment may be advantageous as it may allow an individual recovery of data items.

According to one embodiment, the method further includes: receiving a request by the HSM client to restore the multiple data items, said request indicating a full backup date; forwarding the request by the HSM client to the HSM server; determining and selecting the record in the data structure where the full backup date field is identical to the full backup date and time stamp; determining the storage location from the selected record in the data structure by the HSM server and sending the data from this storage location to the HSM client. This embodiment may allow a may allow a recovery of all data items that have been backed up at the same time.

FIG. 1 shows a HSM system 100. The HSM system 100 includes a first storage tier 132 that stores a data item 110a. Coupled to the first storage tier 132 is a HSM versioning client 102. The HSM system 100 further includes a second storage tier 134 that stores a copy 110b of the data item 110a. Coupled to the second storage tier 134 is the HSM versioning server 104. The HSM versioning server 104 includes a data structure 106 where it tracks data identifiers, object IDs and storage location for data 110b stored in the second storage tier 134. The HSM versioning client 102 in conjunction with the HSM versioning server 104 may perform migrate, pre-migrate and recall operations. Network 122 connects the components. Network 122 may be one network but it can also be multiple networks connecting components.

Migrating a data item includes moving the data item from the first storage tier to the second storage tier, deleting the data item in the first storage tier and creating a stub file referring to the data item as stored in the second storage tier.

Pre-migrating a data item includes copying the data item in the second storage tier which results in two copies of the data item; one copy in the first storage tier and another copy in the second storage tier.

Recalling a data item includes retrieving the data item from the second storage tier into the first storage tier, thereby changing the HSM status parameter value of the data item to indicate the pre-migrated state. Recalling is only done for data items having a HSM status parameter value that indicates the migrated state. The recall operation may be initiated when a stub file referring to the data item in the second storage tier is opened.

Connected to the first storage tier 132 is host system 120. Host system 120 reads and writes data 110a in the first storage tier 132. For example, data is identified by the host system 120 with a data identifier. In case the first storage tier 132 is managed by a file storage system the data identifier may be the path and/or file name of the data. In case the first storage tier 132 is managed by a block storage system the data identifier may be a block address. The data identifier may be unique within a first tier storage system.

Data item 110a and 110b includes metadata 112 and content 114. Metadata 112 for data may include access control lists (ACL), attributes and extended attributes further describing the data item 110. Data item 110a stored in the first storage tier 132 is associated with a HSM status parameter having values stored in the metadata 112 and more particular in an extended attribute. The HSM status parameter is maintained by the HSM versioning client 102. The HSM status parameter may have a first, second or third value. The first value indicates a pre-migrated state in which the current version of data 110a has been copied to the second storage tier 134, which means that there is a copy of data item 110a in the first storage tier 132 and in the second storage tier 134 (stored as data 110b). The second value indicates a migrated state in which the current version of data item 110a has been moved to the second storage tier 134, whereby the content 114 of data item 110a in the first storage tier 132 has been deleted and the metadata includes a reference to the data item 110b in the second storage tier 134. In another embodiment, the data item 110a in the first storage tier has been stubbed (to generate a stub file) to a smaller size to refer to the data item 110b. The third value indicates a resident state in which the current version of data item 110a has not been migrated or pre-migrated to the second storage tier 134. In this case, the data item 110a may or may not have an associated object ID. For example, if the current version of the data item is the first version of the data item 110a, then there is no object ID associated with the data item 110a, since it has not been moved before to the HSM versioning server 104 that creates such object IDs. However, if the current version of the data item 110a is not the first one, the data item 110a may be associated with the initial object ID that corresponds to the first version of data item 110a. For example, if the current version is the second version, the first version of the data item 110a may have been already copied into the HSM versioning server 104 that created the initial object ID which is stored in the HSM versioning client 102.

In addition to the data item 110b, metadata of data item 110b may be stored in the second storage tier 134. The metadata may include ACL, attributes and extended attributes further describing the data item.

The HSM versioning server 104 is configured to maintain the versioning data structure 106. The versioning data structure 106 is shown in table 200a of FIG. 2 whereby a row is a record, and a column is a field.

In table 200a, column 211 shows the data identifier of the data item 110a as it is stored in the first storage tier 132. Column 212 shows the object identifier that the HSM versioning server 104 generated for the data item 110b. Column 213 includes the parent object ID of the data item 110b. All versions of data item 110b in the second storage tier 134 have the same parent object ID. Column 214 shows the date and time stamp when the data item 110b has been stored in the second storage tier 134. Column 215 shows the storage location of the data item 110b in the second storage tier 134. Column 216 shows the metadata 112 of the data item 110b in the second storage tier 134. The metadata may be stored directly in this field or in a separate object that is referenced by this field. The metadata includes but is not limited to the access control list, attributes and extended attributes of the data.

A record in table 200a-d is created in versioning data structure 106 for each data item 110b stored in the second storage tier 134.

The object ID and the HSM status parameter value is stored in the metadata 112 of the data item 110a. This metadata of data can be an inode. This metadata may be maintained by the HSM versioning client 102 in a separated data structure. The separate data structure representing data items (e.g., data item 110a) as records (rows) having a first column identifying HSM status parameter values for respective data items and a second column identifying object IDs for respective data items. The HSM versioning client 102 receives a request to pre-migrate or migrate data item 110a from the first storage tier 132 to the second storage tier 134 (pre-migrating refers to copying the data in both storage tiers 132 and 134 and migrating refers to copying the data in the second storage tier 134 only and stubbing the file while adding a reference or a link to that stored in the first storage tier 132). The data item 110a to be pre-migrated or migrated is thereby denoted by a data identifier. The HSM versioning client 102 determines the object ID and the value of the HSM status parameter from the metadata 112 of the data item 110a in the first storage tier 132. If the HSM status parameter value indicates "migrated" or "pre-migrated" state, then the HSM versioning client 102 rejects the request to pre-migrate data indicating that the data item 110a is already migrated or pre-migrated. Otherwise, if the HSM status parameter value indicates "resident" state and the object ID is available then the HSM versioning client 102 sends a data storage request to the HSM versioning server 104 along with the data item 110a, the metadata 112, the object ID and the data identifier. Otherwise, if the HSM status indicates "resident" state and the object ID is not available then the HSM versioning client 102 sends a data storage request to the HSM versioning server 104 along with the data item 110a, metadata 112 and the data identifier.

The HSM versioning server 104 receives the request to store data item 110a in the second storage tier 134 as data item 110b, generates a new unique object ID, determines the current date and time and a storage location and a metadata storage location on the second storage tier 134. The HSM versioning server 104 uses the object ID sent by the HSM versioning client 102 to determine all records where the parent object ID matches (is identical) this object ID in the versioning data structure (in column 213 of table 200a-d).

If the object ID (e.g., the initial object ID) had been sent by the HSM versioning client 102, HSM versioning server 104 determines and selects, from the records determined, the record where the storage date in the data structure 106 (column 214 of table 200a-d) is the youngest. The HSM versioning server 104 replaces the object ID field of the selected record (column 212 of table 200a-d) with the newly generated object ID. The HSM versioning server 104 creates a new record in the versioning data structure 106 and stores the data identifier obtained from the HSM versioning client 102 (column 211 in table 200a-d), the object ID obtained from the HSM versioning client 102 as the object ID (e.g., the initial object ID; column 212 of table 200a-d), the parent object ID (e.g., the initial object ID; column 213 of table 200a-d), the current date and time stamp (column 214 of table 200a-d) and the storage location in the second storage tier 134 (column 215 of table 200a-d). The new created record becomes then the youngest record. The HSM versioning server 104 determines if the number of records identified before where the parent object ID is identical to the object ID from the HSM versioning client 102 is greater than a predefined maximum number of versions and responsive to this it deletes records with the oldest storage date until the number of records is equal the predefined maximum number of versions. The HSM versioning server 104 may send an acknowledgment back to the HSM versioning client 102. The acknowledgment message may indicate for example a confirmation of the storage request.

If the object ID had not been sent by the HSM versioning client 102, then the HSM versioning server 104 creates a new record in the versioning data structure 106 and stores the data identifier obtained from the HSM versioning client 102 (column 211 in table 200a-d), the newly generated object ID (column 212 and 213 of table 200a-d), the current date and time stamp (column 214 of table 200a-d) and the storage location in the second storage tier 134 and metadata 112 (column 215 and 216 of table 200a-d). A return object ID is set to the newly generated object ID. The HSM versioning server 104 stores the data item 110b received by the HSM versioning client 102 at the determined storage locations, the metadata 112 in the data structure 106 and sends an acknowledgment back to the HSM versioning client 102 including the return object ID. Responsive to this the HSM versioning client 102 stores the object ID in the metadata of the data item 110a and updates the HSM status parameter value to indicate migrated or pre-migrated state depending on the requested operation; and if the operation was a migration the HSM versioning client 102 deletes the content 114 of the data 110a from the first tier storage 132.

The versioning process may be explained in more details with reference to tables 200a-200d of FIG. 2 showing the versioning data structure 106 (table 200a-d) of the HSM versioning server 104 where data has been migrated or pre-migrated and versioned.

Table 200a shows the first version of data being stored. Row 201 of table 200a shows the data with identifier "/home/myfile.txt" (column 211) had been stored (migrated or pre-migrated) in the second storage tier 134 at the storage location "/home/users/user1/myfile.txt.1" (column 215) and metadata is stored in "/12345/metadata.object.1" (column 216) on 23-08-2013 at 12:00:00 (column 214). The object ID (column 212) and the parent object ID (column 213) are identical indicating that there is one version of this data. The metadata in this example is stored as data at the named storage location.

Table 200b shows the second version of the data being stored. A second version is stored if the first version has been updated (this makes the data resident) and a subsequent pre-migration or migration operation is executed. Row 202 is almost identical to row 201 except that the object ID is different (13690). This is the new object ID that had been generated by the HSM versioning server 104 after a new version of the file with identifier "/home/myfile.txt" had been migrated or pre-migrated. Row 203 of table 200b shows the new version of data with identifier "/home/myfile.txt" (column 211) that had been stored (migrated or pre-migrated) in the second storage tier 134 at the storage location "/home/users/user1/myfile.txt.2" (column 215) and metadata stored in "/12345/metadata.object.2" (column 216) on 24-08-2013 at 12:00:00 (column 214). The object ID (column 212) and the parent object ID (column 213) are identical indicating that this is the latest version.

Table 200c shows the third version of the data being stored in the second storage tier 134 whereby the third version has a different data identifier because the data identifier had been renamed in the first storage tier 132. Row 204 is identical to row 202 of table 200b. Row 205 is almost identical to row 203 of table 200b except that the object ID is different (14567). This is the new object ID that had been generated by the HSM versioning server 104 after a new version of the file with identifier "/home/myfilenew.txt" had been migrated or pre-migrated. Row 206 of table 200c shows the new version of data with a different identifier "/home/myfilenew.txt" (column 211) that had been stored (migrated or pre-migrated) in the second storage tier 134 at the storage location "/home/users/user1/myfilenew.txt.3" (column 215) and metadata stored in "/12345/metadata.object.3" (column 216) on 25-08-2013 at 12:00:00 (column 214). The object ID (column 212) and the parent object ID (column 213) are identical indicating that this is the latest version.

Table 200d shows the fourth version of the data being stored in the second storage tier 104 whereby the fourth version has a different metadata. Row 207 is identical to row 204 of table 200c. Row 208 is identical to row 205 of table 200c. Row 209 is almost identical to row 206 of table 200c except that the object ID is different (15564). This is the new object ID that had been generated by the HSM versioning server after a new version of the file with identifier "/home/myfilenew.txt" had been created from the versioning HSM server 104 after the request from the versioning HSM client 102 was sent to add new metadata (column 216). Row 210 of table 200d shows the new version of data with a different metadata location "/12345/metadata.object.4" (column 216) that had been updated (synchronization of the first storage tier 132 with the second storage tier 134) in the second storage tier 134 at the storage location "/home/users/user1/myfilenew.txt.3" (column 215) and metadata stored in "/12345/metadata.object.4" (column 216) on 26-08-2013 at 12:00:00 (column 214). The object ID (column 212) and the parent object ID (column 213) are identical indicating that this is the latest version.

In the following example, the HSM versioning client 102 receives a request to restore a version of data item 110a from the second storage tier 134 whereby the version is identified by a version number and the data is identified by a data identifier. The HSM versioning client 102 determines the object ID of the data item 110a from its metadata 112. If no object ID is available, the HSM versioning client 102 returns the request indicating that no version of this data 110a exists in the second storage tier 134.

Otherwise, the HSM versioning client 102 sends a data version restore request to the HSM versioning server 104 including the object ID and the version number. Responsive to this, the HSM versioning server 104 determines all records in the data structure 106 where the parent object ID is identical to the object ID (column 213 of table 200a-d) sent by the HSM versioning client and sorts the determined records by storage date (column 214 of table 200a-d) in an ascending order.

The HSM versioning server 104 selects the record from the determined records that is identical to the version number (e.g. the record at the row number matching the version number). The HSM versioning server 104 determines the storage location on the second storage tier 134 (column 215 of table 200a-d) from the selected record and sends the data 110b to the HSM versioning client 102 along with the metadata obtained from the data structure (column 216 in table 200a-d) of the selected record. Responsive to this the HSM versioning client 204 stores the data in the first storage tier 132 as data 110a and updates the HSM status parameter value of the data item to indicate pre-migrated state. The version number can be a date and time stamp and thereby the date and time stamp is matched against the determined records (column 214 of table 200a-d).

In another example, the versioning HSM client 102 may receive a request to synchronize data item 110a from the first storage tier 132 with the data item 110b on the second storage tier 134.

The versioning HSM client 102 determines if the data item 110a stored on the first storage tier 132 has an object ID.

Furthermore it determines the migration state of the data item 110a. If the data item 110a on the first storage tier 132 is associated with a HSM status parameter having a value indicating "pre-migrated" or "migrated" state, the HSM versioning client 102 sends the object ID along with the metadata 112 to the HSM versioning server 104. The HSM versioning server 104 uses the object ID received to identify the youngest version of data object 110b using the data structure 106 (column 211 and 214 of table 200a-d) stored on the second storage tier 134 and compares the metadata 112 received from the HSM versioning client 102 with the metadata of the selected youngest version and if the metadata does not match it updates the metadata field of the selected record in the data structure 106 (column 216 table 200a-d) with the metadata received from the HSM versioning client. This way changes of metadata such as access control list or extended attributes do not cause the entire data content 114 of data 110a to be transferred, just the metadata 112.

Figure 3:
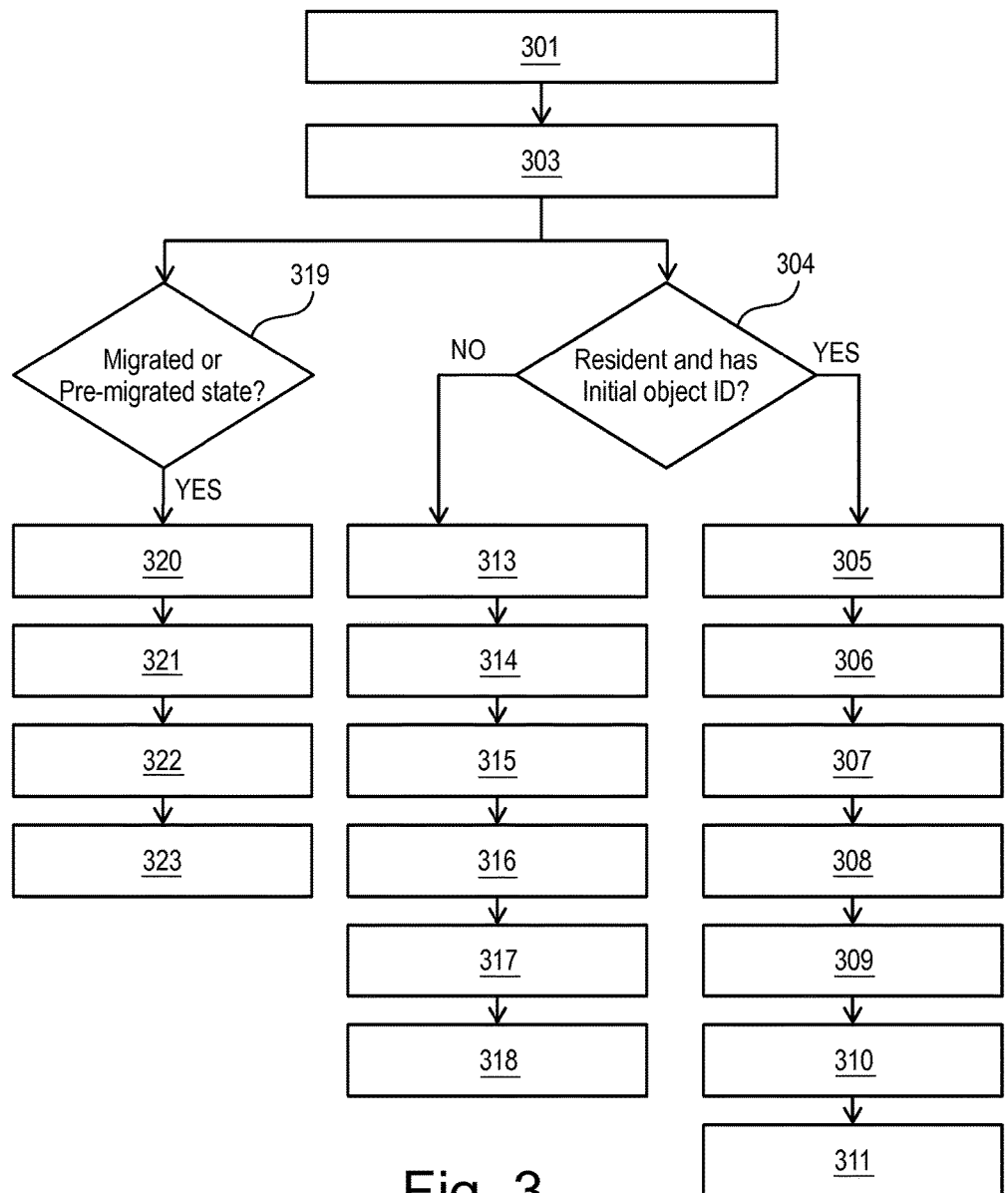
FIG. 3 is a flowchart of a method for performing a full-backup in a HSM system.

FIG. 3 is a flowchart of a method for performing a full backup in the HSM system 100, wherein the HSM versioning server 104 is configured to act as a backup server by adding by the HSM versioning server 104 a full backup date field in the data structure 106 e.g. a new column may be added to table 200a-d of FIG. 2.

The HSM versioning client 102 may receive (301) a request to perform a full backup of the first storage tier 132. The first storage tier 132 may comprise multiple data items including for example the data item 110a.

For each data item e.g. 110a of the multiple data items:
The HSM versioning client 102 determines (303) the HSM status parameter value of the data item 110a.

If the HSM status parameter value indicates the resident state, the HSM versioning client 102 determines if the data item 110a is associated with an initial object ID (304).

If the data item 110a is associated with the initial object ID, operations 305-311 may be executed.

If the data item 110a is not associated with the initial object ID, operations 313-318 may be executed.

The HSM versioning client 102 sends (305) a data backup request to the HSM versioning server 104 for storing the data item 110a, the data backup request including at least the data item and the initial object ID and a data identifier of the data item.

The HSM versioning server 104 may generate (306) a new object ID for the data item 110a.

A record from one or more records in the data structure where the parent object ID field is identical to the initial object ID may be selected (307). The selected record has the youngest creation date.

The object ID field of the selected record may be updated (308) with the generated object ID.

A new record may be created (309) in the data structure and the parent object ID field and object ID field may be set (309) in the created record to the initial object ID. The full backup date field of the created record may be set to the current date.

The HSM versioning server 104 may determine (310) a storage location for the data item 110a on the second storage tier 134 and store (310) the data item 110a in the storage location.

The HSM versioning server 104 may send (311) the HSM versioning client 102 an acknowledgment message as a response to the received data backup request.

The HSM versioning client 102 may send (313) a data backup request to the HSM server for storing the data item 110a. The data backup request includes at least the data item 110a.

The HSM versioning server 104 may generate (314) a new object ID for the data item.

The HSM versioning server 104 may create (315) a record in the data structure and set (315) the parent object ID field and object ID field in the created record to the generated object ID.

The HSM versioning server 104 may set (316) the full backup date field of the created record to the current date.

The HSM versioning server 104 may determine (317) a storage location for the data item 110a on the second storage tier 134 and store the data item in the storage location.

The HSM versioning server 104 may send (318) an acknowledgment message to the HSM versioning client 102 as a response to the received data backup request. The acknowledgment message includes the newly generated object ID.

If the determined (319) HSM status parameter value indicates one of the migrated and pre-migrated states, the HSM versioning client 102 may send (320) a data backup request to the HSM versioning server 104 for backing up the data item 110a. The data backup request includes at least the initial object ID.

The HSM versioning server 104 may select (321) a record in the data structure where the parent object ID field is identical to the initial object ID.

The HSM versioning server 104 may set (322) the full backup date field of the selected record to the current date.

The HSM versioning server 104 may send (323) an acknowledgment message as a response to the received data backup request.

A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. The amount of processing resources may indicate the use degree of each of the physical components such as CPU, memory, and N/W bandwidth included in the computer system and their money cost. It is further under stood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

It is understood that one or more of the aforementioned embodiments may be combined as long as the combined embodiments are not mutually exclusive.

LIST OF REFERENCE NUMERALS

100 HSM system
102 HSM versioning client
104 HSM versioning server
106 data structure
110 data item
112 metadata
114 data content
120 host system
122 network
132 first storage tier
134 second storage tier
200a-d tables
201-210 rows
211-216 columns

What is claimed is:

1. A method for storing data in a hierarchical storage management (HSM) system, the method comprising:
receiving, by a first controller, a request to migrate a data item to a first storage tier managed by the first controller, wherein (i) the request associates the data item with at least an initial object ID that is an object ID of a first version of the data item and (ii) the data item is associated with a HSM status parameter value that indicates that the data item is in a resident state, and, in response:
generating, by the first controller, a new object ID;
identifying, by the first controller, a first record in a data structure that includes a plurality of records based, at least in part, on the initial object ID being identical to an object ID of the first record and to a parent object ID of the first record;
replacing, by the first controller, the object ID of the first record with the new object ID;
creating, by the first controller, a new record in the data structure, wherein the new record is associated with the data item;
setting, by the first controller, an object ID field of the new record and a parent object ID field of the new record to the initial object ID; and
storing, by the first controller, the data item to the first storage tier.

2. The method of claim 1, further comprising:
determining, by the first controller, that a count of one or more records having a parent object ID identical to the initial object ID exceeds a threshold count and, in response, reducing the count to the threshold count by deleting at least one record having a storage date older than storage dates of other records of the one or more records.

3. The method of claim 1, further comprising:
responsive to receiving, by a second controller, an acknowledgement from the first controller, updating the HSM status parameter value of the data item to indicate one of a migrated state and a pre-migrated state, wherein the second controller manages a second storage tier, and wherein the request to migrate the data item is received from the second controller.

4. The method of claim 1, further comprising:
receiving, by the first controller, a restoration request to restore a version of the data item from the first storage tier, wherein each record in the data structure is associated with a version number, and wherein the request includes a version number of the version of the data item and the initial object ID of the version of the data item, and, in response:
identifying, by the first controller, one or more records that have a parent object ID that is identical to the initial object ID;
selecting from the identified records, by the first controller, a record that has a version number that is identical to the version number included in the restoration request; and
responsive to determining, by the first controller, a storage location of the data item that is associated with the selected record, sending, by the first controller, a data item that is stored at the storage location.

5. The method of claim 1, further comprising:
responsive to receiving, by the first controller, updated metadata, comparing, by the first controller, the updated metadata to metadata that is associated with the new record; and
responsive to determining, by the first controller, that the metadata that is associated with the new record does not match the updated metadata, storing, by the first controller, the updated metadata on the first storage tier and updating, by the first controller, the new record to associate the updated metadata with the new record.

6. The method of claim 1, further comprising:
setting, by the first controller, a full backup date of the new record to a current date and a time stamp of the new record to a current time.

7. The method of claim 6, further comprising:
responsive to receiving, by the first controller, a backup restoration request that includes a full backup date and a time stamp, wherein the full backup date and the time stamp correspond to a backup of a data item:
identifying, by the first controller, a record in the data structure that has a full backup date and a time stamp that are identical to the full backup date and the time stamp included in the backup restoration request; and
sending, by the first controller, a data item that is associated with the identified record.

8. A computer program product for storing data in a hierarchical storage management (HSM) system, the computer program product comprising:
a computer readable storage device and program instructions stored on the computer readable storage device the program instructions comprising:
program instructions to receive a request to migrate a data item to a first storage tier managed by a first controller, wherein (i) the request associates the data item with at least an initial object ID that is an object ID of a first version of the data item and (ii) the data item is associated with a HSM status parameter value that indicates that the data item is in a resident state, and, in response:
generate a new object ID;
identify a first record in a data structure that includes a plurality of records based, at least in part, on the initial object ID being identical to an object ID of the first record and to a parent object ID of the first record;
replace the object ID of the first record with the new object ID;
create a new record in the data structure, wherein the new record is associated with the data item;
set an object ID field of the new record and a parent object ID field of the new record to the initial object ID; and
store the data item to the first storage tier.

9. The computer program product of claim 8, the program instructions further comprising:
program instructions to, responsive to determining that a count of one or more records having a parent object ID identical to the initial object ID exceeds a threshold count, reduce the count to the threshold count by deleting at least one record having a storage date older than storage dates of other records of the one or more records.

10. The computer program product of claim 8, the program instructions further comprising:
program instructions to receive a restoration request to restore a version of the data item from the first storage tier, wherein each record in the data structure is associated with a version number, and wherein the request includes a version number of the version of the data item and the initial object ID of the version of the data item, and, in response:
identify one or more records that have a parent object ID that is identical to the initial object ID;
select from the identified records a record that has a version number that is identical to the version number included in the restoration request; and
responsive to determining a storage location of the data item that is associated with the selected record, send a data item that is stored at the storage location.

11. The computer program product of claim 8, the program instructions further comprising:
program instructions to, responsive to receiving updated metadata, compare the updated metadata to metadata that is associated with the new record; and
program instructions to, responsive to determining that the metadata that is associated with the new record does not match the updated metadata, store the updated metadata on the first storage tier and update the new record to associate the updated metadata with the new record.

12. The computer program product of claim 8, the program instructions further comprising:
program instructions to set a full backup date of the new record to a current date and a time stamp of the new record to a current time.

13. The computer program product of claim 12, the program instructions further comprising:
program instructions to, responsive to receiving a backup restoration request that includes a full backup date and a time stamp, wherein the full backup date and the time stamp correspond to a backup of a data item:
identify a record in the data structure that has a full backup date and a time stamp that are identical to the full backup date and the time stamp included in the backup restoration request; and
send a data item that is associated with the identified record.

14. A computer system for storing data in a hierarchical storage management (HSM) system:
one or more computer processors;
one or more computer readable storage devices;
program instructions stored on the computer readable storage devices for execution by at least one of the one or more processors, the program instructions comprising:
program instructions to receive a request to migrate a data item to a first storage tier managed by a first controller, wherein (i) the request associates the data item with at least an initial object ID that is an object ID of a first version of the data item and (ii) the data item is associated with a HSM status parameter value that indicates that the data item is in a resident state, and, in response:
generate a new object ID;
identify a first record in a data structure that includes a plurality of records based, at least in part, on the initial object ID being identical to an object ID of the first record and to a parent object ID of the first record;
replace the object ID of the first record with the new object ID;
create a new record in the data structure, wherein the new record is associated with the data item;
set an object ID field of the new record and a parent object ID field of the new record to the initial object ID; and
store the data item to the first storage tier.

15. The computer system of claim 14, the program instructions further comprising:
program instructions to, responsive to determining that a count of one or more records having a parent object ID identical to the initial object ID exceeds a threshold count, reduce the count to the threshold count by deleting at least one record having a storage date older than storage dates of other records of the one or more records.

16. The computer system of claim 14, the program instructions further comprising:
   program instructions to update the HSM status parameter value of the data item to indicate one of a migrated state and a pre-migrated state in response to storing the data item on the first storage tier.

17. The computer system of claim 14, the program instructions further comprising:
   program instructions to receive a restoration request to restore a version of the data item from the first storage tier, wherein each record in the data structure is associated with a version number, and wherein the request includes a version number of the version of the data item and the initial object ID of the version of the data item, and, in response:
      identify one or more records that have a parent object ID that is identical to the initial object ID;
      select from the identified records a record that has a version number that is identical to the version number included in the restoration request; and
      responsive to determining a storage location of the data item that is associated with the selected record, send a data item that is stored at the storage location.

18. The computer system of claim 14, the program instructions further comprising:
   program instructions to, responsive to receiving updated metadata, compare the updated metadata to metadata that is associated with the new record; and
   program instructions to, responsive to determining that the metadata that is associated with the new record does not match the updated metadata, store the updated metadata on the first storage tier and update the new record to associate the updated metadata with the new record.

19. The computer system of claim 14, the program instructions further comprising:
   program instructions to set a full backup date of the new record to a current date and a time stamp of the new record to a current time.

20. The computer system of claim 19, the program instructions further comprising:
   program instructions to, responsive to receiving a backup restoration request that includes a full backup date and a time stamp, wherein the full backup date and the time stamp correspond to a backup of a data item:
      identify a record in the data structure that has a full backup date and a time stamp that are identical to the full backup date and the time stamp included in the backup restoration request; and
      send a data item that is associated with the identified record.

* * * * *